(12) United States Patent
Flohr et al.

(10) Patent No.: US 11,010,897 B2
(45) Date of Patent: May 18, 2021

(54) IDENTIFYING IMAGE ARTIFACTS BY MEANS OF MACHINE LEARNING

(71) Applicant: Siemens Healthcare GmbH, Erlangen (DE)

(72) Inventors: Thomas Flohr, Uehlfeld (DE); Bernhard Schmidt, Fuerth (DE)

(73) Assignee: SIEMENS HEALTHCARE GMBH, Erlangen (DE)

( * ) Notice: Subject to any disclaimer, the term of this patent is extended or adjusted under 35 U.S.C. 154(b) by 73 days.

(21) Appl. No.: 16/142,076

(22) Filed: Sep. 26, 2018

(65) Prior Publication Data

US 2019/0102883 A1    Apr. 4, 2019

(30) Foreign Application Priority Data

Oct. 2, 2017 (DE) .......................... 102017217550.8

(51) Int. Cl.
*G06T 7/00* (2017.01)
*G06K 9/62* (2006.01)

(52) U.S. Cl.
CPC .......... *G06T 7/0014* (2013.01); *G06K 9/6256* (2013.01); *G06K 2209/051* (2013.01); *G06T 2207/10081* (2013.01); *G06T 2207/10088* (2013.01); *G06T 2207/10116* (2013.01); *G06T 2207/10132* (2013.01); *G06T 2207/20081* (2013.01); *G06T 2207/30061* (2013.01); *G06T 2207/30168* (2013.01)

(58) Field of Classification Search
CPC .. G06K 9/00; G06K 9/6256; G06K 2209/051; G06T 7/0014; G06T 2207/10081; G06T 2207/10088; G06T 2207/10116; G06T 2207/10132; G06T 2207/20081; G06T 2207/30061; G06T 2207/30168
USPC ........................................ 382/128
See application file for complete search history.

(56) References Cited

U.S. PATENT DOCUMENTS

| 9,594,983 | B2 * | 3/2017 | Alattar | ............... G06F 21/16 |
| 2016/0203599 | A1 * | 7/2016 | Gillies | ............... A61B 6/463 |
|  |  |  |  | 382/132 |
| 2016/0242854 | A1 | 8/2016 | Grass et al. |  |
| 2016/0321808 | A1 * | 11/2016 | Zhou | ............... G06T 11/005 |
| 2017/0271984 | A1 * | 9/2017 | Kohn | ............... G05B 15/02 |

(Continued)

OTHER PUBLICATIONS

German Office Action #102017217550.8 dated Jul. 9, 2018.

*Primary Examiner* — Ali Bayat
(74) *Attorney, Agent, or Firm* — Harness, Dickey & Pierce, P.L.C.

(57) ABSTRACT

A method is for producing an identification unit for identifying image artifacts automatically. In an embodiment, the method includes providing a learning processing apparatus; providing an initial identification unit; providing a first image data library including artifact reference acquisitions containing image artifacts; and training the identification unit using the image artifacts. An identification method is for identifying image artifacts automatically in an image acquisition. In an embodiment, the identification method includes: providing a trained identification unit; providing an image acquisition produced via a medical imaging system; inspecting the image acquisition for image artifacts by the identification unit; and labeling the ascertained image artifacts.

29 Claims, 4 Drawing Sheets

(56) References Cited

U.S. PATENT DOCUMENTS

2017/0365047 A1\* 12/2017 Beque .................... G16H 30/20
2018/0078312 A1\* 3/2018 Trayanova ............. G16H 30/20
2018/0177461 A1\* 6/2018 Bell ..................... A61B 5/7267

\* cited by examiner

IDENTIFYING IMAGE ARTIFACTS BY MEANS OF MACHINE LEARNING

PRIORITY STATEMENT

The present application hereby claims priority under 35 U.S.C. § 119 to German patent application number DE 102017217550.8 filed Oct. 2, 2017, the entire contents of which are hereby incorporated herein by reference.

FIELD

Embodiments of the invention generally relate to a method for producing an identification unit for identifying image artifacts automatically in an image acquisition that was produced by way of a medical imaging system, and to an identification unit and to a learning processing apparatus for this purpose. Embodiments of the invention also generally include an identification method for using the identification unit to identify image artifacts automatically in an image acquisition that was produced by way of a medical imaging system, and also generally includes a control device for controlling a medical imaging system and a corresponding medical imaging system. In the context of embodiments of the invention, an image acquisition is a digital image, so comprises or consists of image data.

BACKGROUND

In imaging techniques in medicine, the creation of each pixel of an image acquisition usually relies on evaluating a single measurement variable or a single physical measurement principle. For instance, computed tomography (CT) detects as a single measurement variable the local X-ray attenuation by the patient. This issue also arises in other imaging techniques such as magnetic resonance imaging or ultrasound examination, for example.

Although sometimes radiation in two or more energy bands is employed, in particular for identifying different substances in tissue, for instance in multi-energy acquisitions, this does not alter the fundamental problem that always only one underlying physical principle, e.g. X-ray attenuation, is used.

Interference effects can cause image artifacts to appear in the image acquisition, which cannot be easily eliminated because of the lack of redundancy in the measured values. In the worst case, these artifacts can cause an incorrect positive diagnosis or an incorrect negative diagnosis.

CT images of lung parenchyma (lung perfused blood volume-Lung PBV), for example, often comprise motion artifacts in the region of the heart, which present themselves as dark zones of apparently no perfusion. Images of the thoracic cavity, in particular aforethe images of the lung parenchyma, may also comprise rib shadows caused by scattered radiation. They present themselves as typical dark zones emanating from the ribs and can be misidentified as regions of reduced iodine absorption. A high contrast-agent density in the vena cava can produce dark bar artifacts in images, which can be misidentified in iodine images as regions of low iodine absorption. In spectral CT acquisitions of the abdomen, the hepatic dome, for example, likewise because of scattering, often exhibits an apparently increased iodine absorption. Further frequently occurring image artifacts are, inter alia, streaks, ripple patterns, partial volume effects or pseudo-enhancement.

SUMMARY

The inventors have discovered that these image artifacts cannot be recognized in an automated manner using conventional methods, and therefore artifacts in image acquisitions must be recognized and manually tagged by a diagnostician, for instance a physician.

At least one embodiment of the present invention provides an alternative, more convenient identification method and a corresponding identification unit and a control device for controlling a medical imaging installation automatically, which avoid the disadvantages described above and allow image artifacts to be recognized reliably and in an automated manner. At least one embodiment of the invention is also directed to producing the identification unit and corresponding processing apparatuses.

Embodiments are directed to a method, an identification unit, a learning processing apparatus, an identification method, a control device, and a medical imaging system.

The method according to an embodiment of the invention for producing an identification unit for identifying image artifacts automatically in an image acquisition from a medical imaging system comprises:

providing a learning processing apparatus, the learning processing apparatus being designed via an algorithm to recognize graphical elements in image acquisitions;

providing on, or in, the learning processing apparatus, an initial identification unit designed to be trained by way of machine learning;

providing a first image data library including artifact reference acquisitions produced via a medical imaging system, the artifact reference acquisitions including image artifacts; and training the identification unit according to a machine learning principle, based upon recognizing the image artifacts of the artifact reference acquisitions of the first image data library.

An identification unit, according to an embodiment of the invention, is for identifying image artifacts automatically in an image acquisition from a medical imaging system. An embodiment of the identification unit includes one which has been produced by a method according to an embodiment of the invention. The identification unit according to an embodiment of the invention includes one produced according to the machine learning principle from an initial identification unit, with the training carried out on the basis of recognizing image artifacts in artifact reference acquisitions of a provided first image data library. The recognition is one performed by way of the recognition algorithm by a provided learning processing apparatus that comprised an initial identification unit which has been trained.

A learning processing apparatus according to an embodiment of the invention comprises a processor and a data storage device containing instructions which, on being executed, allow the processor to capture reference acquisitions provided to the processing apparatus, to recognize image objects in the reference acquisitions as objects, and to identify in accordance with the method according to an embodiment of the invention, image artifacts in these image objects as artifact objects, and to train an initial identification unit according to an embodiment of the method.

A learning processing apparatus of an embodiment of the invention comprises:

a processor; and a data storage device storing instructions which, upon being executed, allow the processor to at least:

capture reference acquisitions provided to a processing apparatus, recognize image objects in reference acquisitions as objects, and identify image artifacts in the image objects as artifact objects, and to train an initial identification unit according to a machine learning principle, based upon recognizing the image artifacts of the artifact reference acquisitions of a first image data library of the identification unit.

An identification method, according to an embodiment of the invention for identifying image artifacts automatically in an image acquisition from a medical imaging system, comprising:

providing an identification unit;

providing an image acquisition produced via a medical imaging system;

inspecting, via the identification unit, the image acquisition for image artifacts; and by processing the image acquisition, at least one of
labeling image artifacts ascertained during the inspecting,
reducing image artifacts ascertained during the inspecting, and
eliminating image artifacts ascertained during the inspecting.

A control device according to an embodiment of the invention for a medical imaging system is designed to perform an identification method according to an embodiment of the invention.

A medical imaging system according to an embodiment of the invention comprises a control device according to an embodiment of the invention.

In this respect, at least one embodiment of the invention is also achieved by a corresponding non-transitory computer program product comprising a computer program, which can be loaded directly into a memory device of a control device and/or of a processing system and which contains program segments, in order to perform the method according to an embodiment of the invention when the program is executed. The computer program product may comprise in addition to the computer program, if applicable, extra elements such as e.g. documentation and/or extra components, including hardware components, such as e.g. hardware keys (dongles etc.) for using the software.

For transfer to the control device and/or to the processing system, and/or for storage on, or in, the control device and/or the processing system, a non-transitory computer-readable medium, for instance a memory stick, a hard disk or any other portable or permanently installed data storage medium can be used, on which are stored the program segments of the computer program, which program segments can be downloaded and executed by a processing unit. For this purpose, the processing unit can comprise, for example, one or more interacting microprocessors or the like.

Therefore also preferred is an identification unit in the form of a non-transitory computer program product comprising a computer program which can be loaded directly into a memory device of a processing system or of a control device of a medical imaging system and which contains program segments in order to perform the identification method according to at least one embodiment of the invention when the computer program is executed in the processing system or the control device.

BRIEF DESCRIPTION OF THE DRAWINGS

The invention is described again below in greater detail using example embodiments and with reference to the accompanying figures. Identical components are denoted by the same reference numbers in the various figures, which are generally not shown to scale and in which.

DETAILED DESCRIPTION OF THE EXAMPLE EMBODIMENTS

Figure 1:
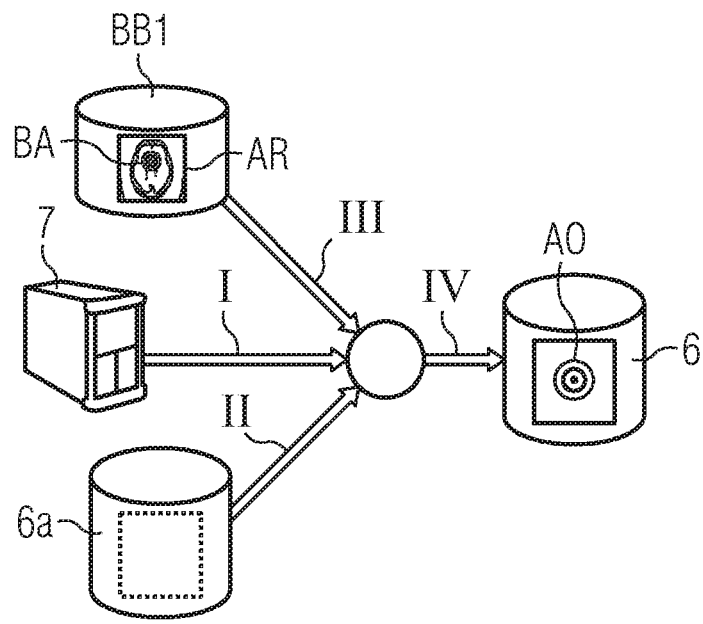
FIG. 1 is a schematic diagram of a first example embodiment of the method according to an embodiment of the invention for producing an identification unit according to an embodiment of the invention.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuity such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Most of the aforementioned components, in particular the identification unit, can be implemented in full or in part in the form of software modules in a processor of a suitable control device or of a processing system. An implementation largely in software has the advantage that even control devices and/or processing systems already in use can be easily upgraded by a software update in order to work in the manner according to at least one embodiment of the invention.

A solution to the problem described above is very complex, and identifying image artifacts is not easily possible. In addition, it is not possible to produce easily an identification unit. Therefore an embodiment of the invention includes not only the identification unit and a method for identifying image artifacts using this identification unit, but also producing the identification unit and the corresponding processing apparatus.

In addition, the identification also presents the opportunity to eliminate image artifacts, and/or to control a medical imaging device in such a way that on an artifact being recognized, it makes a second image acquisition using other acquisition parameters in order to achieve an artifact-free image acquisition of the region, or subject, concerned. This is also part of at least one embodiment of the invention.

The method according to an embodiment of the invention for producing an identification unit for identifying image artifacts automatically in an image acquisition from a medical imaging system comprises:

Providing a Learning Processing Apparatus.

Embodiments of the learning processing apparatus are described in more detail further below. An embodiment of the learning processing apparatus is designed by using an algorithm (also referred to as a "recognition algorithm") to recognize graphical elements in the image acquisition or in image data of the image acquisitions. Graphical elements refer here, for example, to patterns, graphical primitives and/or continuous surfaces or structures or the like. For instance, these can also include more complex structures such as organs, bones, vessels, etc., for example, or even artifacts.

Providing an Initial Identification Unit.

The initial identification unit is the subsequent identification unit, but which has not yet been trained or has not yet been optimally trained. It is provided on, or in, the learning processing apparatus and is designed to be trained by way of machine learning (by the processing apparatus). The recognition algorithm may here also be part of the (initial) identification unit itself, for instance.

Providing a First Image Data Library.

This first image data library can also be called an "artifact library" and comprises in particular spectral, artifact reference acquisitions from a medical imaging system, which artifact reference acquisitions comprise image artifacts. The reference acquisitions are image acquisitions, i.e. comprise or consist of image data. The first image data library may be, for example, a database which contains artifact reference acquisitions and has a data link to the learning processing apparatus. A suitable medical imaging system may be, for example, a computed tomography (CT) machine, a magnetic resonance imaging (MRI) machine, an ultrasound device, an X-ray system for angiography, a system for interventional radiology or another X-ray system.

Training the Identification Unit.

The identification unit is trained in this step according to a machine learning principle on the basis of recognizing the image artifacts of the artifact reference acquisitions of the first image data library. The recognition is performed via the recognition algorithm.

"An image acquisition from a medical imaging system" refers here to an image acquisition of an object under examination (also called the "subject"), for instance of an organ, part of the body and/or region of a patient, which image acquisition has been produced by the medical imaging system. This can involve two-dimensional images or image data, volume image data or even an image dataset composed of a plurality of image data, for instance a stack of two-dimensional image data.

Since image artifacts are normally not intelligible to a computer, information about the artifacts can be stored in the form of (computer-intelligible) objects. In this regard, the identification unit can contain, for example, objects that correspond to the image artifacts. These are referred to below as "artifact objects". For the purpose of identifying image artifacts, initially unknown structures, for example, in examined image acquisitions can be compared with these artifact objects. In the event of a match with an artifact object, the structure concerned would be labeled as an image artifact.

An identification unit, according to an embodiment of the invention, is for identifying image artifacts automatically in an image acquisition from a medical imaging system. An embodiment of the identification unit includes one which has been produced by a method according to an embodiment of the invention. The identification unit according to an embodiment of the invention includes one produced according to the machine learning principle from an initial identification unit, with the training carried out on the basis of recognizing image artifacts in artifact reference acquisitions of a provided first image data library. The recognition is one performed by way of the recognition algorithm by a provided learning processing apparatus that comprised an initial identification unit which has been trained.

A learning processing apparatus according to an embodiment of the invention comprises a processor and a data storage device containing instructions which, on being executed, allow the processor to capture reference acquisitions provided to the processing apparatus, to recognize image objects in the reference acquisitions as objects, and to identify in accordance with the method according to an embodiment of the invention, image artifacts in these image objects as artifact objects, and to train an initial identification unit according to an embodiment of the method.

An identification method according to an embodiment of the invention for identifying image artifacts automatically in an image acquisition from a medical imaging system comprises:

Providing an Identification Unit.

The identification unit is a unit that has been trained as described above. In this context, training of an initial identification unit can also be performed in particular first.

Providing an Image Acquisition.

The image acquisition is an image acquisition from a medical imaging system. This system preferably works according to the same principle as that which has acquired the reference acquisitions, in order that the artifacts are also comparable with one another.

Inspecting the Image Acquisition for Image Artifacts.

The inspection is performed by the identification unit.

Labeling the Ascertained Image Artifacts.

The image artifacts can be labeled simply using tags, although it is also possible to substitute artifact objects for the image artifacts and hence to add computer-intelligible elements to the resultant image. The labeling can be performed directly in the image acquisition or in an additional representation, for instance in an additional image layer.

Alternatively or additionally, the ascertained image artifacts can be eliminated or at least reduced by processing the image acquisition.

A control device according to an embodiment of the invention for a medical imaging system is designed to perform an identification method according to an embodiment of the invention.

A medical imaging system according to an embodiment of the invention comprises a control device according to an embodiment of the invention.

Most of the aforementioned components, in particular the identification unit, can be implemented in full or in part in the form of software modules in a processor of a suitable control device or of a processing system. An implementation largely in software has the advantage that even control devices and/or processing systems already in use can be easily upgraded by a software update in order to work in the manner according to at least one embodiment of the invention.

In this respect, at least one embodiment of the invention is also achieved by a corresponding non-transitory computer program product comprising a computer program, which can be loaded directly into a memory device of a control device and/or of a processing system and which contains program segments, in order to perform the method according to an embodiment of the invention when the program is executed. The computer program product may comprise in addition to the computer program, if applicable, extra elements such as e.g. documentation and/or extra components, including hardware components, such as e.g. hardware keys (dongles etc.) for using the software.

For transfer to the control device and/or to the processing system, and/or for storage on, or in, the control device and/or the processing system, a non-transitory computer-readable medium, for instance a memory stick, a hard disk or any other portable or permanently installed data storage medium can be used, on which are stored the program segments of the computer program, which program segments can be downloaded and executed by a processing unit. For this purpose, the processing unit can comprise, for example, one or more interacting microprocessors or the like.

Therefore also preferred is an identification unit in the form of a non-transitory computer program product comprising a computer program which can be loaded directly into a memory device of a processing system or of a control device of a medical imaging system and which contains program segments in order to perform the identification method according to at least one embodiment of the invention when the computer program is executed in the processing system or the control device.

An identification unit is preferred in the form of a computer-readable medium, on which are stored program segments which can be downloaded and executed by a processing unit in order to perform all the steps of the identification method according to an embodiment of the invention when the program segments are executed by the processing unit. The identification unit in the form of this computer-readable medium can also exist as hardware, for instance as a programmed EPROM.

Further, particularly advantageous embodiments and developments of the invention are given in the claims and in the following description, where the claims in one category of claims can also be developed in a similar way to the claims and passages of the description in another category of claims, and in particular individual features of different example embodiments or variants can also be combined to create new example embodiments or variants. In particular, the identification unit according to at least one embodiment of the invention can also be developed in a similar way to the method claims or embodiments in passages of the description.

An embodiment of the method according to the invention comprises providing a second image data library, which can also be called a "clear-acquisitions library". This clear-acquisitions library comprises (preferably spectral) clear reference acquisitions from a medical imaging system. These clear reference acquisitions comprise substantially no image artifacts. Since it is always possible to find some kind of image artifacts, systemic to the acquisition technology (e.g. image noise), in real acquisitions, the expression "substantially" is used here to refer to image acquisitions that according to current standards can be considered as usable acquisitions containing at most minimal image artifacts, or to those parts of artifact-affected image acquisitions that meet these standards.

In this case, training the identification unit is preferably based additionally on recognizing image components of the clear reference acquisitions of the second image data library. As a result, image components contained solely in the artifact reference acquisitions can be tagged explicitly as image artifacts, and preferably image components contained solely in the clear reference acquisitions of the second image data library can be tagged explicitly as artifact-free image objects.

An embodiment of the method according to the invention is also preferred in which the artifact reference acquisitions of the first image data library, and preferably also the clear reference acquisitions of the second image data library, are acquisitions of an object in the form of dual-energy (spectral) computed tomography acquisitions or multi-energy computed tomography acquisitions. Thus in particular they comprise acquisitions at at least two different acquisition energies, e.g. high kV, low kV. Alternatively or additionally, it is preferred that the reference acquisitions comprise acquisitions decomposed according to material, e.g. in the form of a two-material decomposition or three-material decomposition.

An embodiment of the method according to the invention is also preferred in which the provided artifact reference acquisitions of the first image data library, and preferably also the clear reference acquisitions of the second image data library, comprise already labeled image objects. It is preferred here that artifact reference acquisitions contain image artifacts labeled as artifact objects. Clear reference acquisitions contain preferably image objects containing no artifacts and labeled as non-artifact objects. This has the advantage that the learning step can be performed more efficiently.

An embodiment of the method according to the invention is also preferred in which a first base-element library is created from a set of artifact reference acquisitions, in particular from a large number of spectral CT result images, for instance resulting from material decomposition or similar computational techniques. This first base-element library comprises artifact objects as base elements. Also a second base-element library is preferably created using clear reference acquisitions. This second base-element library comprises non-artifact objects as base elements. The artifact objects and non-artifact objects have been recognized automatically via the identification unit or have been tagged by prior labeling, as was described earlier. The labeling can have been performed manually or automatically.

As an alternative, or in addition, to the aforementioned base-element libraries (which can also be called a dictionary), it is also possible to generate a base-element library that contains different instances of image noise as base elements.

The previous section containing preferred embodiments is concerned with producing an identification unit according to the invention. A trained identification unit is assumed below, which can be used to identify image artifacts.

Preferably, the image acquisitions containing recognized image artifacts can be used again as artifact reference acquisitions, and the image acquisitions without image artifacts as clear reference acquisitions. Thus once an identification has been made, additional training of the identification unit or of another identification unit can be performed according to a method described above.

An embodiment of the identification method according to the invention is preferred that can be used additionally to achieve a reduction in image artifacts in an image acquisition from a medical imaging system. In this case, the identification unit has been trained additionally by clear reference acquisitions, as already described above. This preferred embodiment comprises the step of eliminating or at least reducing the ascertained image artifacts by processing (graphically) the image acquisition. In particular, the effect of the processing is that image objects that have been identified as image artifacts are removed and/or replaced by corresponding non-artifact objects.

An embodiment of the identification method according to the invention is preferred in which a first base-element library, which comprises artifact objects as base elements, is provided, and preferably also a second base-element library, which comprises non-artifact objects as base elements, is provided. The base-element libraries have already been described above. As part of this preferred method, at least one (preferably spectral) combination image is generated in a (standard) optimization process by combinations of the base elements of a base-element library. In this process, a combination image composed of image artifacts is generated, and preferably also a complementary combination image containing reduced artifacts is generated. These combination images exist preferably in the form of a combination-image group, wherein the combination image composed of image artifacts can be separated from the combination image containing reduced artifacts. For instance, the combination image composed of image artifacts and the combination image containing reduced artifacts can exist as different layers in a combination-image group.

As another preferred embodiment of the aforementioned embodiment of the identification method according to an embodiment of the invention, the combination image comprises an image from the group: calcium image, iodine image, virtual non-contrast image, water image and soft-tissue image, iron image, contrast-agent image and a mono-energy image.

An embodiment of the identification method according to the invention is also preferred that can be used alternatively or additionally for controlling a medical imaging system. This embodiment comprises the additional steps:

Providing a Control Data Library.

In this control data library are held control datasets for a medical imaging system that are computationally linked to artifact objects. The control datasets can be configured in particular in such a way that the image artifacts to which they are computationally linked are suppressed when the control dataset is used.

Selecting a Control Dataset.

The control dataset is selected here on the basis of at least one identified image artifact in an inspected image.

Using the Selected Control Dataset.

The selected control dataset is here used for re-acquisition of the subject (or object under examination) of the inspected image acquisition. The body region acquired in the original image acquisition is thereby acquired again using a control dataset optimized for suppressing these artifacts, resulting in an improved image acquisition. It is hence unnecessary to repeat the entire examination because of artifact-affected images, since when reduced quality is ascertained, an image is re-acquired immediately using optimized control.

In the following explanations it is assumed that the medical imaging system or imaging installation is a computed tomography system. In principle, however, the method can also be used on other imaging installations.

FIG. 1 shows a schematic diagram of a simple embodiment of the method according to an embodiment of the invention for producing an identification unit according to an embodiment of the invention.

Figure 3:
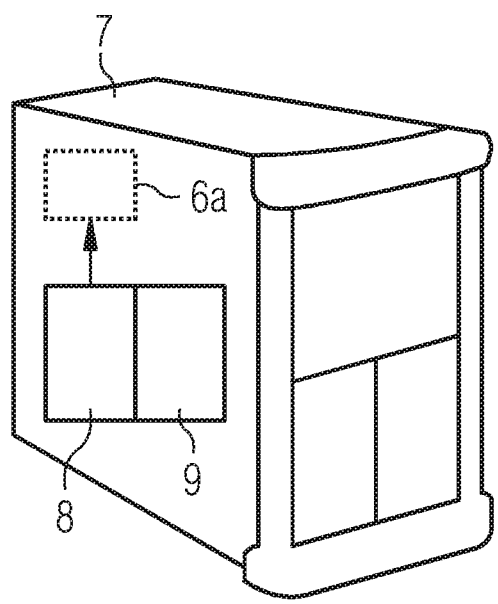
FIG. 3 is a schematic diagram of an example embodiment of a preferred learning processing apparatus.

In step I, a learning processing apparatus 7 is provided, the learning processing apparatus 7 being designed via an algorithm to recognize graphical elements in image acquisitions or in image data of the image acquisitions (see also FIG. 3 on this subject).

In step II, an initial identification unit 6a is provided, which is designed to be trained by way of machine learning, and basically constitutes the untrained identification unit 6. This initial identification unit 6a is provided on, or in, the learning processing apparatus 7, so for instance as a database that has a data link to this learning processing apparatus 7, as shown in the figure, or provided as a data structure directly in this learning processing apparatus 7.

In step III, a first image data library BB1 is provided, comprising artifact reference acquisitions AR from a medical imaging system 1 (i.e. artifact reference acquisitions AR that have been produced via a medical imaging system 1, preferably the same type of medical imaging system 1 as was used to produce the image acquisitions to be inspected, so for instance a CT system for inspecting CT acquisitions, etc.), wherein the artifact reference acquisitions AR comprise image artifacts BA.

The circle at which the three arrows denoted by I, II, III terminate is here the output state at which the three previous aspects have been provided. Now, in order to produce the identification unit 6, the initial identification unit 6a must be trained.

This training of the identification unit 6 takes place in step VI according to the machine learning principle on the basis of recognizing the image artifacts BA of the artifact reference acquisitions AR of the first image data library BB1. In order to make clear that the identification unit 6 is trained, a schematic artifact object AO has been shown in the identification unit 6 in this example.

Figure 2:
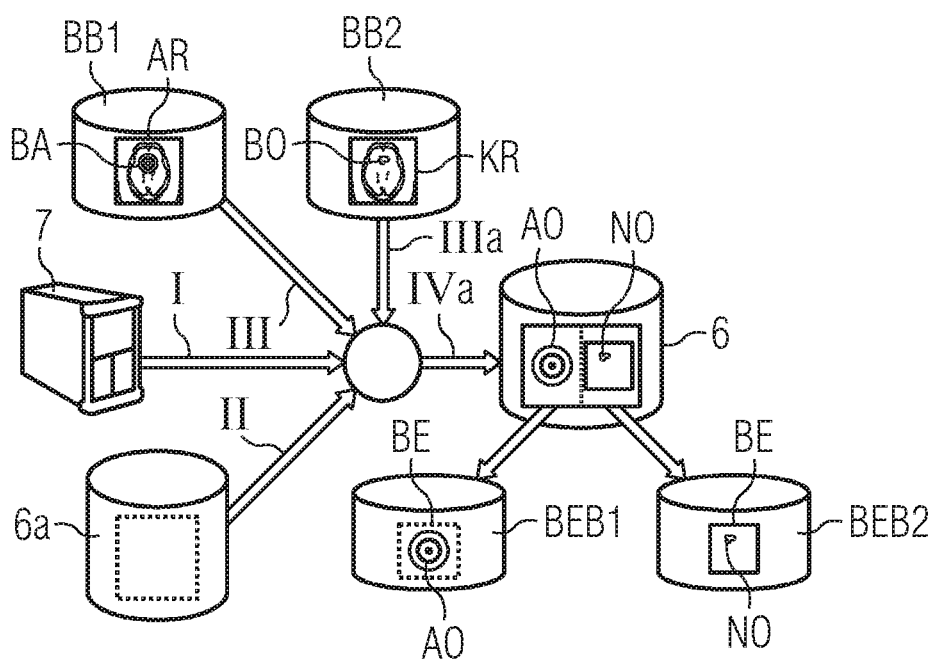
FIG. 2 is a schematic diagram of a second example embodiment of the method according to an embodiment of the invention for producing an identification unit according to an embodiment of the invention.

FIG. 2 shows a schematic diagram of another example embodiment of the method according to the invention for producing an identification unit according to an embodiment of the invention. This figure is an extension of FIG. 1, with the steps I, II and III again being performed here. Unlike the method shown in FIG. 1, the identification unit 6 is trained not just by image artifacts BA but also by artifact-free clear reference images KR.

Thus unlike FIG. 1, the additional step IIIa is performed, in which a second image data library BB2 is provided, comprising clear reference acquisitions KR from a medical imaging system 1, which clear reference acquisitions KR comprise substantially no image artifacts BA, preferably no image artifacts whatsoever.

Training the identification unit 6 in step IVa is consequently based on recognizing image components of the clear reference acquisitions KR of the second image data library BB2. In order to make clear that this identification unit 6 is trained both by image artifacts and additionally by clear reference acquisitions, in this example both an artifact object AO and a non-artifact object NO have been shown schematically in the identification unit 6.

Base-element libraries BEB1, BEB2 can be produced using the artifact objects AO and the non-artifact objects NO respectively. Shown on the left is a first base-element library BEB1, which comprises as base elements BE, artifact objects AO recognized by the identification unit 6. Shown on the left is a second base-element library BEB2, which comprises as base elements BE, non-artifact objects NO recognized by the identification unit 6.

FIG. 3 shows a schematic diagram of a preferred learning processing apparatus 7. This learning processing apparatus 7 comprises a processor 8 and a data storage device 9, which are depicted here as blocks. The data storage device 9 contains instructions which, on being executed, allow the processor 8 to capture reference acquisitions AR, KR provided to the processing apparatus, to recognize image objects BO in the reference acquisitions AR, KR as objects, and to identify in accordance with one of the mentioned methods, image artifacts BA in these image objects BO as artifact objects AO, and to train an initial identification unit 6a, for instance according to an embodiment of the method according to the invention shown in FIGS. 1 and 2.

Figure 4:
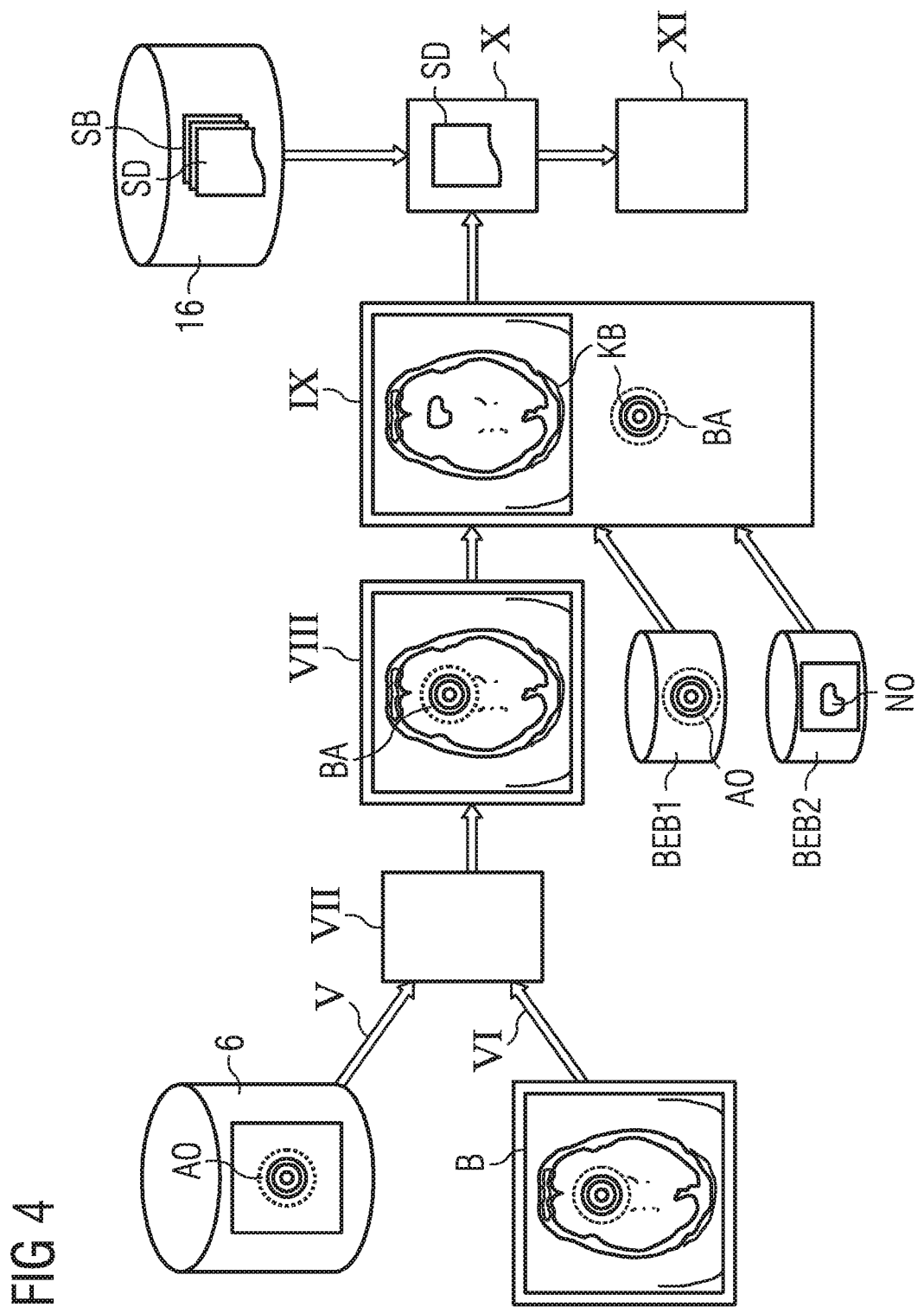
FIG. 4 is a flow diagram of a possible sequence of an example embodiment of a method according to an embodiment of the invention for identifying image artifacts.
Figure 5:
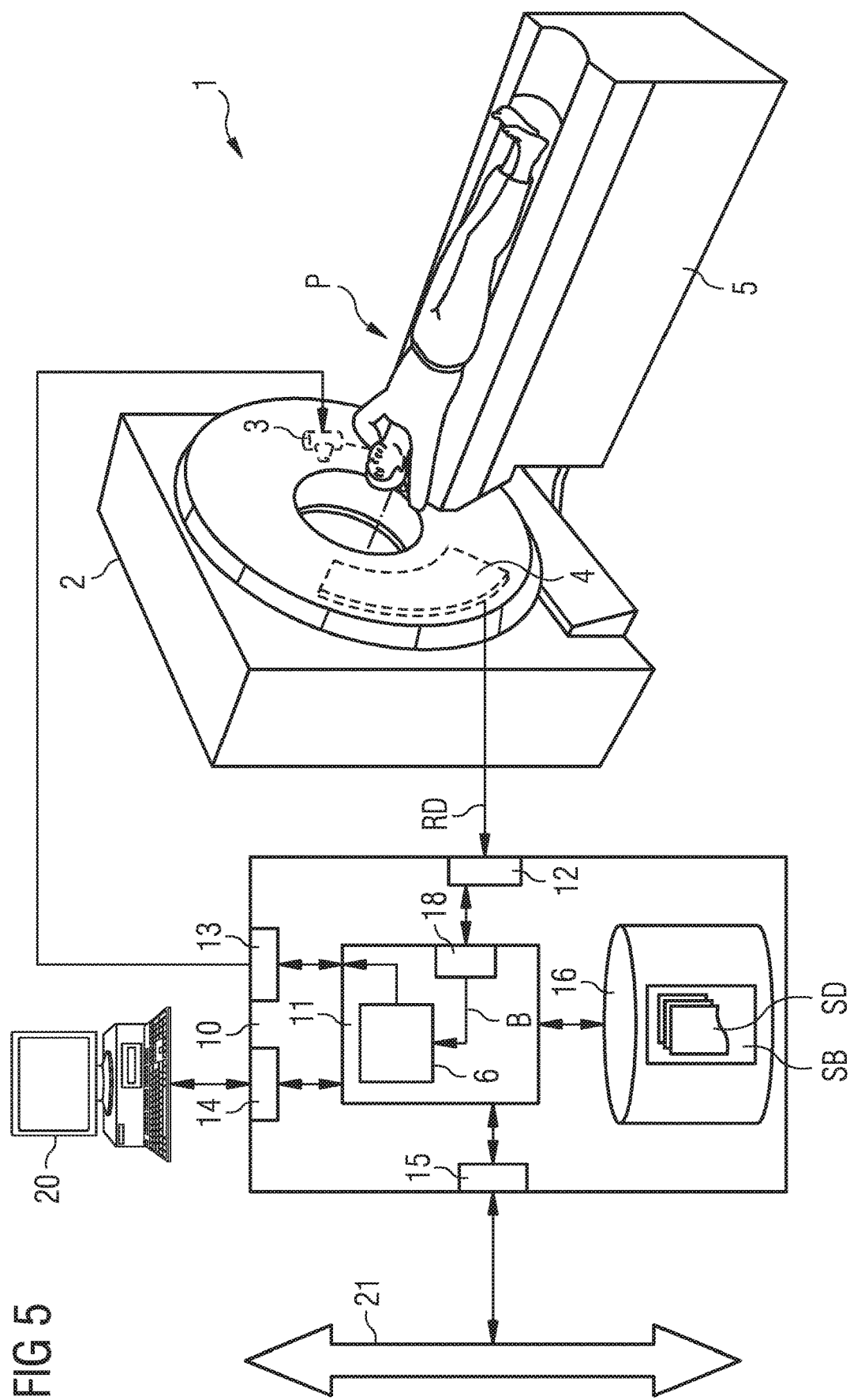
FIG. 5 shows a highly schematic diagram of a medical imaging system having an example embodiment of a control device according to an embodiment of the invention and identification unit for performing the method.

FIG. 4 shows a flow diagram of a possible sequence of a method according to an embodiment of the invention for identifying image artifacts BA in an image acquisition B from a medical imaging system 1 such as shown in FIG. 5, for example.

In step V, an identification unit 6 is provided that has been produced, for example, according to a method shown in FIG. 1 or 2. The artifact object AO shown schematically in the identification unit 6 is intended to make clear that the identification unit 6 has been trained to identify this pattern as an image artifact BA in image acquisitions B. The image artifact BA and the artifact object AO are a ripple pattern in this example, but this is merely representative of all the other possible types of artifact.

In step VI, an image acquisition B from a medical imaging system 1 is provided. In this case, the image acquisition B is a tomogram through a human skull. In the upper part of the image acquisition B can be seen a ripple pattern, which represents an image artifact BA, which has not yet been identified automatically.

In step VII, the image acquisition B is inspected for image artifacts BA by the identification unit 6. The ripple pattern is identified in this process as an image artifact BA, because it has the same structure as the artifact object AO depicted in the identification unit 6 in step V.

In step VIII, the ascertained image artifact BA is labeled automatically, which is represented by a dashed circle.

Up until this step, an example method for purely identifying image artifacts was presented. With the automatic identification of image artifacts BA, however, it is also possible to introduce, in addition, or as an alternative, to the automatic labeling, elimination of this image artifact BA and/or automatic control of a medical imaging system 1, as the further method steps illustrate.

Below, the ascertained image artifacts BA are eliminated or at least reduced by processing the image acquisition B. This is done here by providing a first base-element library BEB1 and a second base-element library BEB2, as were presented in more detail above in the context of FIG. 2. For reasons of clarity, the fine details of the two base-element libraries BEB1, BEBS have not been shown. The symbol for the ripple pattern in the top library and the symbol for the segment of the CT image in the bottom library are meant to indicate, however, that they comprise base elements BE in the form of artifact objects AO (first base-element library BEB1) and non-artifact objects NO (second base-element library BEB2).

In step IX, at least one group comprising two combination images KB is produced by combinations of the base elements BE of the two provided base-element libraries BEB1, BEB2.

In this process, a combination image KB composed of image artifacts BA is generated, and preferably also a complementary combination image KB containing reduced artifacts is generated. The two combination images are shown one below the other in FIG. 4 to improve understanding. In practice, the combination images can exist in a combination-image group. For instance, the combination image composed of image artifacts and the combination image containing reduced artifacts can exist as different layers in the combination-image group.

Theoretically, the previously described step IX can be omitted for the subsequent step X (itself also optional). For the control performed in step X, in principle an image artifact merely needs to be identified.

First, a control data library SB is provided, in which are held control datasets SD for a medical imaging system 1. These control datasets SD are computationally linked to artifact objects AO, so that a control dataset can be selected on the basis of an identified image artifact.

In step X, a control dataset SD is selected according to at least one identified image artifact BA in an examined image acquisition B.

In step XI, this selected control dataset SD is used for controlling the medical imaging system 1 for the re-acquisition of at least the examined image acquisition B. This new image acquisition can thereby be acquired using new parameters, which are selected specifically for eliminating the recognized artifact in the acquisition. The end result of this is a stack of artifact-reduced images.

FIG. 5 shows highly schematically a computed tomography system 1 having a control device 10 for performing identification of image artifacts, and preferably also for performing a learning process in accordance with a method according to an embodiment of the invention.

The computed tomography (CT) system 1 comprises, as is standard practice, a scanner 2 having a gantry, in which an X-ray source 3 rotates, which sends radiation through a patient P, who is moved by a couch 5 into a measuring chamber of the gantry so that the radiation arrives at a detector 4 situated opposite the X-ray source 3. It is mentioned explicitly that the example embodiment shown in FIG. 5 is only one example of a CT system, and the invention can also be used on any other CT systems.

Likewise, for the control device 10, only those components are shown that are essential to explaining the invention or aid understanding. Such CT systems and associated control devices generally are known to a person skilled in the art and therefore need not be explained in detail.

Similarly, the invention can also be used on any other medical imaging systems.

A core component of the control device 10 is here a processor 11, on which various components are implemented in the form of software modules. The control device 10 also comprises a terminal interface 14, connected to which is a terminal 20, via which an operator can operate the control device 10 and hence the computed tomography system 1. A further interface 15 is a network interface for connecting to a data bus 21, in order to establish thereby a connection to an RIS or PACS (RIS: radiology information system; PACS: picture archiving and communication system). For instance, image data from image acquisitions can be forwarded via this bus 21.

The scanner 2 can be controlled by the control device 10 via a control interface 13, i.e. it is possible to control, for instance, the rotation speed of the gantry, the movement of the patient couch 5 and the X-ray source 3 itself. The raw data RD is read out from the detector 4 via an acquisition interface 12.

The control device 10 also comprises a storage unit 16, in which is held a control data library SB containing control datasets SD. The control datasets SD are in this case computationally linked to artifact objects AO.

One component on the processor 11 is an image data reconstruction unit 18, which can be used to reconstruct from the raw data RD received via the data acquisition interface 12, the desired image data B of the image acquisitions B. This image data reconstruction unit 18 passes the reconstructed image data B of an image acquisition B to an identification unit 6, in which first, in accordance with a method according to an embodiment of the invention, image artifacts BA are identified in the image acquisition B and are processed as artifact objects by the identification unit 6 (see e.g. FIG. 4).

In the event that an image artifact BA has been found and an artifact object AO has been created, a control dataset SD is selected from the control data library (SB), which is provided by the storage unit 16, on the basis of at least one identified image artifact BA or its artifact object BO, and the selected control dataset SD is used to produce a new image acquisition B, which preferably likewise is inspected for artifacts. A set of artifact-free or at least artifact-reduced image acquisitions B can thereby be produced automatically.

Finally it should be reiterated that the method described in detail above and the presented apparatuses are merely example embodiments, which can be modified by a person skilled in the art in many ways without departing from the scope of the invention. In addition, the use of the indefinite article "a" or "an" does not rule out the possibility of there also being more than one of the features concerned. Likewise, the terms "unit" and "module" do not exclude the possibility that the components in question consist of a plurality of interacting sub-components, which may also be spatially distributed if applicable.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for producing a trained identification unit for identifying image artifacts in an image acquisition via a medical imaging system, the method comprising:

training, by a learning processing apparatus, an initial identification unit according to a machine learning principle to obtain a trained identification unit, the learning processing apparatus configured to recognize graphical elements in image acquisitions, the training being based on recognizing image artifacts of artifact reference acquisitions included in a first image data library, the artifact reference acquisitions being produced via a medical imaging system; and generating a new image in response to identifying, by the trained identification unit, an image artifact in an acquired image.

2. The method of claim 1, wherein the training the initial identification unit is additionally based on recognizing image components of clear reference acquisitions included in a second image data library, the clear reference acquisitions being produced via a medical imaging system, and the clear reference acquisitions including substantially no image artifacts; and image components contained in the artifact reference acquisitions and not in the clear reference acquisitions are tagged as image artifacts.

3. The method of claim 2, wherein the artifact reference acquisitions of the first image data library and the clear reference acquisitions of the second image data library include at least one of:

acquisitions of an object at two different acquisition energies; or acquisitions decomposed according to material.

4. The method of claim 2, wherein the artifact reference acquisitions of the first image data library and the clear reference acquisitions of the second image data library include labeled image objects, the artifact reference acquisitions including image artifacts labeled as artifact objects, and the clear reference acquisitions including image objects having no artifacts labeled as non-artifact objects.

5. The method of claim 1, further comprising:
creating a first base-element library from a set of the artifact reference acquisitions, the first base-element library including artifact objects as base elements; and
creating a second base-element library using clear reference acquisitions, the second base-element library including non-artifact objects as base elements.

6. An identification unit for identifying image artifacts in an image acquisition from a medical imaging system, produced by the method of claim 1.

7. A learning processing apparatus, comprising:
a data storage device storing computer-readable instructions; and
a processor configured to execute the computer-readable instructions to capture reference acquisitions,
recognize image objects in the reference acquisitions,
identify image artifacts in the image objects as artifact objects, and
train an identification unit according to a machine learning principle based on recognizing the image artifacts of the reference acquisitions.

8. An identification method for identifying image artifacts in an image acquisition produced via a medical imaging system, the identification method comprising:
training an identification unit based on recognizing image artifacts of artifact reference acquisitions included in a first image data library;
inspecting, via the identification unit, an image acquisition for image artifacts, the image acquisition being produced via a medical imaging system; and
processing the image acquisition to generate a new image, the processing including at least one of
labeling the image artifacts ascertained based on the inspecting,
reducing the image artifacts ascertained based on the inspecting, or
eliminating all of the image artifacts ascertained based on the inspecting.

9. The identification method of claim 8, wherein the processing comprises generating at least one combination image based on a combination of first base elements of a first base-element library, the first base elements being artifact objects.

10. The identification method of claim 9, wherein the at least one combination image includes at least one of: a calcium image, an iodine image, a virtual non-contrast image, a water image, a soft-tissue image, an iron image, a contrast-agent image or a mono-energy image.

11. The identification method of claim 8, further comprising:
providing a control data library including control datasets for a medical imaging system, the control datasets corresponding to artifact objects; and
selecting a control dataset from among the control datasets according to at least one identified image artifact ascertained in the image acquisition, wherein the processing includes using the control dataset for re-acquisition of a subject of the image acquisition.

12. A control device, for controlling a medical imaging system, comprising:
at least one processor configured to execute computer-readable instructions to inspect an acquired image for image artifacts;
process the acquired image by at least one of
labeling the image artifacts ascertained based on the inspection,
reducing the image artifacts ascertained based on the inspection, and
eliminating all of the image artifacts ascertained based on the inspection; and
generate at least one combination image based on the acquired image as processed and a combination of base elements of a base-element library, the base elements being artifact objects.

13. A medical imaging system, comprising:
the control device of claim 12.

14. A non-transitory computer-readable medium storing a computer program, the computer program including program segments that, when executed by at least one processor, cause the at least one processor to perform the identification method of claim 8.

15. A non-transitory computer-readable medium, storing program segments that, when executed by at least one processor, cause the at least one processor to perform the method of claim 1.

16. The method of claim 2, wherein the generating the new image includes tagging image components contained in the clear reference acquisitions and not in the artifact reference acquisitions as artifact-free image objects.

17. The method of claim 1, wherein the artifact reference acquisitions of the first image data library include at least one of:
acquisitions of an object at two different acquisition energies; or
acquisitions decomposed according to material.

18. The method of claim 1, wherein the artifact reference acquisitions of the first image data library include reference image artifacts labeled as artifact objects.

19. The method of claim 1, further comprising:
creating a first base-element library from a set of artifact reference acquisitions, the first base-element library including artifact objects as base elements.

20. The identification method of claim 9, wherein the generating that at least one combination image generates the at least one combination image based on a combination of the first base elements and second base elements of a second base-element library, the second base elements being non-artifact objects.

21. The identification method of claim 9, wherein the at least one combination image includes a first combination image composed of the image artifacts and a complementary combination image containing fewer artifacts than the first combination image.

22. The identification method of claim 20, wherein the at least one combination image includes a first combination image composed of the image artifacts and a complementary combination image containing fewer artifacts than the first combination image.

23. The identification method of claim 20, wherein the at least one combination image includes at least one of: a calcium image, an iodine image, a virtual non-contrast image, a water image, a soft-tissue image, an iron image, a contrast-agent image or a mono-energy image.

24. The identification method of claim 9, further comprising:
- providing a control data library including control datasets for a medical imaging system, the control datasets corresponding to artifact objects; and
- selecting a control dataset from among the control datasets according to at least one identified image artifact ascertained in the image acquisition,
- wherein the processing includes using the control dataset for re-acquisition of a subject of the image acquisition.

25. A non-transitory computer-readable medium, storing program segments that, when executed by at least one processor, cause the at least one processor to perform the identification method of claim 8.

26. The learning processing apparatus of claim 7, wherein the processor is configured to execute the computer-readable instructions to:
- inspect, via the identification unit, a new image acquisition for image artifacts; and
- generate a combination image based on the new image acquisition and a combination of base elements of a base-element library, the base elements being artifact objects.

27. An identification method for identifying image artifacts in an image acquisition produced via a medical imaging system, the identification method comprising:
- inspecting, via an identification unit, an image acquisition for image artifacts, the image acquisition being produced via a medical imaging system; and
- processing the image acquisition to generate a new image, the processing including at least one of
  - labeling the image artifacts ascertained based on the inspecting,
  - reducing the image artifacts ascertained based on the inspecting, or
  - eliminating all of the image artifacts ascertained based on the inspecting,
- wherein the processing comprises generating at least one combination image based on a combination of first base elements of a first base-element library, the first base elements being artifact objects.

28. An identification method for identifying image artifacts in an image acquisition produced via a medical imaging system, the identification method comprising:
- inspecting, via an identification unit, an image acquisition for image artifacts, the image acquisition being produced via a medical imaging system;
- processing the image acquisition to generate a new image, the processing including at least one of
  - labeling the image artifacts ascertained based on the inspecting,
  - reducing the image artifacts ascertained based on the inspecting, or
  - eliminating all of the image artifacts ascertained based on the inspecting;
- providing a control data library including control datasets for a medical imaging system, the control datasets corresponding to artifact objects; and
- selecting a control dataset from among the control datasets according to at least one identified image artifact ascertained in the image acquisition,
- wherein the processing includes using the control dataset for re-acquisition of a subject of the image acquisition.

29. A control device, for controlling a medical imaging system, comprising:
- at least one processor configured to execute computer-readable instructions to inspect an acquired image for image artifacts;
  - process the acquired image by at least one of
    - labeling the image artifacts ascertained based on the inspection,
    - reducing the image artifacts ascertained based on the inspection, and
    - eliminating all of the image artifacts ascertained based on the inspection;
  - provide a control data library including control datasets for a medical imaging system, the control datasets corresponding to artifact objects; and
  - select a control dataset from among the control datasets according to at least one identified image artifact ascertained in the acquired image,
- wherein the at least one processor is configured to process the acquired image including using the control dataset for re-acquisition of a subject of the acquired image.

* * * * *